(12) United States Patent
Nilsson et al.

(10) Patent No.: US 12,090,813 B2
(45) Date of Patent: Sep. 17, 2024

(54) AIR CONDITIONING SYSTEM FOR A VEHICLE

(71) Applicant: Ningbo Geely Automobile Research & Development Co., Ltd., Ningbo (CN)

(72) Inventors: Magnus Nilsson, Floda (SE); Ronja Rignäs, Bollebygd (SE)

(73) Assignee: Ningbo Geely Automobile Research & Dev. Co., Ltd., Ningbo (CN)

( * ) Notice: Subject to any disclaimer, the term of this patent is extended or adjusted under 35 U.S.C. 154(b) by 264 days.

(21) Appl. No.: 17/693,331

(22) Filed: Mar. 12, 2022

(65) Prior Publication Data
US 2022/0194173 A1    Jun. 23, 2022

Related U.S. Application Data

(63) Continuation of application No. PCT/CN2020/116442, filed on Sep. 21, 2020.

(30) Foreign Application Priority Data

Sep. 25, 2019 (EP) ..................................... 19199686

(51) Int. Cl.
*B60H 1/00* (2006.01)
*B60H 1/32* (2006.01)

(52) U.S. Cl.
CPC ..... *B60H 1/00907* (2013.01); *B60H 1/00271* (2013.01); *B60H 1/32281* (2019.05)

(58) Field of Classification Search
CPC ........... B60K 2015/03427; B60K 2015/03414; B60H 1/3202
See application file for complete search history.

(56) References Cited

U.S. PATENT DOCUMENTS

| 5,138,851 A * | 8/1992 | Mardikian ........... B60N 2/5614 62/434 |
| 6,491,090 B1 | 12/2002 | Frugier |
| 7,640,967 B2 | 1/2010 | Bradley |
| 11,878,566 B2 * | 1/2024 | Koshijima ............. B60K 11/04 |
| 2006/0180235 A1 * | 8/2006 | Kubo ................. H01M 8/04201 141/82 |

(Continued)

FOREIGN PATENT DOCUMENTS

| CN | 1183539 A | 1/2005 |
| CN | 1589368 A | 3/2005 |

(Continued)

OTHER PUBLICATIONS

International Search Report from corresponding International Application No. PCT/CN2020/116442, mailed on Dec. 21, 2020, 3 pages.

*Primary Examiner* — Nelson J Nieves
(74) *Attorney, Agent, or Firm* — Tucker Ellis LLP

(57) ABSTRACT

An air conditioning system for a vehicle. The air conditioning system includes a cooling line adapted to transport a coolant fluid and a first heat-exchanging arrangement connected to the cooling line. The air conditioning system includes a first liquid container being arranged to hold a first liquid heat exchange medium and the first heat-exchanging arrangement is arranged inside the first liquid container for exchanging heat between the coolant fluid and the first liquid heat exchange medium.

12 Claims, 8 Drawing Sheets

(56) References Cited

U.S. PATENT DOCUMENTS

| | | | | |
|---|---|---|---|---|
| 2008/0250804 A1* | 10/2008 | Kubo | ............... | F17C 5/007 |
| | | | | 165/44 |
| 2010/0257890 A1* | 10/2010 | Murakami | ............ | F28D 20/023 |
| | | | | 700/282 |
| 2011/0259285 A1* | 10/2011 | Michikawauchi | ..... | F02M 31/18 |
| | | | | 123/3 |
| 2013/0297234 A1* | 11/2013 | Criel | ............... | B60K 15/035 |
| | | | | 702/51 |
| 2013/0340725 A1* | 12/2013 | Seydell | ............. | B60H 1/32011 |
| | | | | 123/541 |
| 2014/0017621 A1* | 1/2014 | Lida | ............... | H01M 10/54 |
| | | | | 432/13 |
| 2014/0069603 A1* | 3/2014 | Burke | ............... | F02B 29/0443 |
| | | | | 165/41 |
| 2015/0306951 A1 | 10/2015 | Shimokawa | | |
| 2016/0039279 A1* | 2/2016 | Bills | ............... | B60K 15/03 |
| | | | | 165/56 |
| 2017/0107954 A1* | 4/2017 | Kopinsky | ........ | B60K 15/03504 |
| 2017/0370332 A1* | 12/2017 | Kondrk | ............... | F25D 11/003 |
| 2020/0116107 A1* | 4/2020 | Gross | ............... | F02M 25/0227 |
| 2021/0331552 A1* | 10/2021 | Cho | ............... | B60H 1/00271 |
| 2021/0379967 A1* | 12/2021 | Braun | ............... | B60H 1/00328 |
| 2021/0402872 A1* | 12/2021 | Rignäs | ............... | H01M 10/663 |
| 2023/0294486 A1* | 9/2023 | Renault | ............... | F02B 43/12 |
| | | | | 62/50.3 |
| 2023/0347705 A1* | 11/2023 | Koshijima | ............ | F01P 7/048 |

FOREIGN PATENT DOCUMENTS

| | | | | |
|---|---|---|---|---|
| CN | 201212753 Y | | 3/2009 | |
| CN | 102997508 A | | 3/2013 | |
| CN | 109841363 A | | 6/2019 | |
| DE | 4341756 A1 | | 6/1995 | |
| EP | 1329344 A1 | | 7/2003 | |
| EP | 2090448 A1 | | 8/2009 | |
| EP | 2923869 A1 | | 9/2015 | |
| FR | 2824388 A1 * | | 11/2002 | ............ B60H 1/005 |
| GB | 2471506 A | | 1/2011 | |
| JP | 10148415 A * | | 6/1998 | ............ B60H 1/3202 |
| JP | H10211816 A | | 8/1998 | |
| JP | 2013241059 A | | 12/2013 | |
| KR | 20090061995 A | | 6/2009 | |
| WO | 2007110724 A1 | | 10/2007 | |
| WO | WO-2017182924 A1 * | | 10/2017 | ............ B60H 1/00385 |

* cited by examiner

AIR CONDITIONING SYSTEM FOR A VEHICLE

RELATED APPLICATION DATA

This application is a continuation of International Patent Application No. PCT/CN2020/116442, filed Sep. 21, 2020, which claims the benefit of European Patent Application No. 19199686.7, filed Sep. 25, 2019, the disclosures of which are incorporated herein by reference in their entireties.

TECHNICAL FIELD

The invention relates to an air conditioning system for a vehicle, wherein the air conditioning system comprises a cooling line adapted to transport a coolant fluid and a first heat-exchanging arrangement connected to the cooling line. The invention also relates to a method for heat exchange of a coolant fluid of an air conditioning system of a vehicle.

BACKGROUND

An air conditioning system in a vehicle works by exchanging heat between a coolant fluid in the air conditioning system and the outside air, both for condensing the compressed coolant fluid in the condenser and in the evaporator to provide the cabin with cooled air during warm days. Air conditioning systems have been used in vehicles for a long time to increase the comfort of the driver and passengers of a vehicle. However, today's air conditioning system needs to be designed to handle peak loads, for instance when starting a vehicle after it has been standing in the sun for some time. This means that the cooling power of the air conditioning system needs to be made sufficiently large for uncommon situations and the components thereby become large and expensive.

Alternative solutions have been provided. For instance JP H10 211816 discloses an air conditioning system in which a portion of the vehicle's fuel is used as the coolant fluid.

This however, does not solve the problem of having to design the air conditioning system for peak loads.

SUMMARY

An objective of the disclosure is to provide an air conditioning system for a vehicle. The objective is achieved by an air conditioning system for a vehicle, wherein the air conditioning system comprises a cooling line adapted to transport a coolant fluid and a first heat-exchanging arrangement connected to the cooling line. The air conditioning system further comprises a first liquid container arranged to hold a first liquid heat exchange medium. The first heat-exchanging arrangement is arranged inside the first liquid container for exchanging heat between the coolant fluid and the first liquid heat exchange medium.

An advantage with the invention is that it utilizes the higher efficiency of exchanging heat with a liquid than exchanging heat with a gas. Today, the coolant fluid of the air conditioning system exchanges heat with the outside air in order for the coolant fluid to condense, before continuing inside the air conditioning system. By placing a first heat-exchanging arrangement inside a first liquid container of the vehicle, the efficiency of the heat exchange can be increased, thereby leading to a smaller and lighter first heat-exchanging arrangement. In addition, as the efficiency increases, the time needed to reduce the temperature inside the cabin of the vehicle to a desired temperature can be reduced, increasing comfort during warm days.

An additional advantage is that the first liquid heat exchange medium functions as a heat buffer during and after the coolant fluid has exchanged heat with the first liquid heat exchange medium. This leads to that the air conditioning system does not need to be designed based on a peak load cooling power, but instead on an average load cooling power for a typical duration of driving. The first liquid heat exchange medium will slowly cool inside the first liquid container such that a desired temperature of the first liquid heat exchange medium is reached at the end of the drive.

A further advantage with the air conditioning system of the disclosure is that it can assist with heating of the first liquid heat exchange medium in cold temperatures. This leads to a better combustion if the first liquid heat exchange medium is a combustible fuel and to that less energy is required to pre-heat the first liquid heat exchange medium by for instance electric power from the battery or an external source.

The air conditioning system may further comprise a reversing valve connected the first heat-exchanging arrangement, the reversing valve being arranged to selectively reverse the flow of the coolant fluid in the air conditioning system.

By having an air conditioning system with a reversing valve, the first heat-exchanging arrangement of the air conditioning system may be used as both a condenser and as an evaporator. This means that the air conditioning system selectively can be used to exchange heat with the first liquid heat exchange medium in order to reduce the temperature of the coolant fluid or to increase the temperature of the coolant fluid, depending on the desired mode of operation.

The first liquid heat exchange medium may be one of
  liquid fuel such as petrol, diesel, liquefied natural gas or liquefied hydrogen,
  windshield washer fluid,
  engine oil,
  transmission oil.

A vehicle comprises a number of different liquids arranged in liquid containers. Depending on the desired cooling/heating power the air conditioning system is designed to produce, the liquid used can be one of the above mentioned.

The system may further comprise a cooling system separate from the air conditioning system, arranged to condense any vapour evaporated from the first liquid heat exchange medium.

As mentioned above, the first liquid heat exchange medium may act as a heat buffer and will slowly cool when the vehicle is driven. In order to increase the cooling of the first liquid heat exchange medium, an external or separate cooling system can be connected to the first liquid container. This cooling system can assist in condensing any vapour that is produced from heating the first liquid heat exchange medium and transport the liquid back to the first liquid container or transport the liquid to where it is used, for instance in a combustion engine if the first liquid heat exchange medium is a liquid fuel. One example of such a system is described in the European patent application 19163436.9, also by the applicant.

When the first liquid heat exchange medium is one of liquid fuel such as petrol, diesel or liquefied natural gas, the system may further comprise an evaporative emission canister arranged to be connected to the liquid container. The evaporative emission canister is arranged to capture hydrocarbons evaporated from the first liquid heat exchange medium.

When a liquid fuel is used as the first liquid heat exchange medium, vapour that cannot be allowed to vent without being purified into the atmosphere may be produced. As a way to ensure that hydrocarbons in the vapour are not present in any vapour vented into the atmosphere, an evaporative emission canister can be installed in connection to the first liquid container. The evaporative emission canister can be installed alone or in combination with the separate cooling system. The evaporative emission canister can also absorb hydrocarbons in vapour that arises from refuelling the vehicle.

The system may further comprise a second liquid container arranged to hold a second liquid heat exchange medium and a coolant fluid connection arranged in the second liquid container for exchanging heat between the coolant fluid and the second liquid heat exchange medium.

In order to increase the capacity of the air conditioning system or to reduce the maximum increase in temperature in the first liquid heat exchange medium, a second liquid container may be used in which the coolant fluid is led in a coolant fluid connection. In this way, the coolant fluid will be allowed to exchange heat with more fluid than in a system with only a first liquid container and the capacity of the air conditioning system can be increased. Also, the second liquid heat exchange medium in the second liquid container can be used to increase the temperature of the coolant fluid if the first liquid heat exchange medium in the first liquid container is used to decrease the temperature of the coolant fluid or vice versa in order to fine-tune the output temperature of the air conditioning system from the cabin heat exchanging arrangement.

The coolant fluid connection may be a second heat-exchanging arrangement arranged in the second liquid container.

In one example, the coolant fluid connection is a conduit running through the second liquid container. In order to increase the heat exchanging capacity, the coolant fluid connection can, in a second example, be a heat-exchanging arrangement such as a condenser or evaporator used in vehicle air conditioning systems.

The first heat-exchanging arrangement and the second heat-exchanging arrangement may be arranged in series or arranged in parallel.

Depending on the desired function of the first and second heat-exchanging arrangements according to the above description, the first and second heat-exchanging arrangements can be arranged to run in series if only heating or cooling of the coolant fluid is desired. Alternatively, if the choice to be able to cool a portion of the coolant fluid and to be able to heat a portion of the coolant fluid in order to provide improved regulation of the air conditioning system, the first and second heat-exchanging arrangements may be arranged in parallel.

As the volume of the first liquid heat exchange medium in the first liquid container, and if installed, the volume of the second liquid heat exchange medium in the second liquid container determines the amount of heat that can be exchanged without the first and/or second liquid heat exchange medium reaching undesired temperatures, the maximum available cooling power of the air conditioning system may be determined by the volume of the first and/or second liquid heat exchange medium remaining in the first and/or second liquid container.

A further objective of the disclosure is to provide a method for heat exchange of a coolant fluid of an air conditioning system of a vehicle. The objective is achieved by a method for heat exchange of a coolant fluid of an air conditioning system wherein the air conditioning system comprises a cooling line adapted to transport a coolant fluid and a first heat-exchanging arrangement connected to the cooling line, wherein at least one liquid container is arranged to hold a first liquid heat exchange medium and a first heat-exchanging arrangement is arranged within the liquid container. The method comprises starting the air conditioning system,
transporting coolant fluid to the first heat-exchanging arrangement,
exchanging heat between the coolant fluid and the first liquid heat exchange medium to decrease the temperature of the coolant fluid.

The advantages described in conjunction with the air conditioning system above apply also to the method of the disclosure.

The system may further comprise a reversing valve connected to the first heat-exchanging arrangement, being arranged to selectively reverse the flow of the coolant fluid in the air conditioning system, wherein the method comprises:

transporting coolant fluid to the first heat-exchanging arrangement,
exchanging heat between the coolant fluid and the liquid heat exchange medium to increase the temperature of the coolant fluid.

The method may further comprise
condensing any vapour evaporated from the liquid heat exchange medium in the liquid container by the heat exchange with the coolant fluid in the first heat-exchanging arrangement by a cooling system separate from the air conditioning system.

The method may further comprise:
capturing hydrocarbons evaporated from the liquid heat exchange medium of the liquid container by an evaporative emission canister connected to the liquid container when the first liquid heat exchange medium is one of liquid fuel such as petrol, diesel or liquefied natural gas.

The air conditioning system may further comprise a second liquid container arranged to hold a second liquid heat exchange medium and a coolant fluid connection arranged in the second liquid container, wherein the method comprises:

transporting coolant fluid to the coolant fluid connection,
exchanging heat between the coolant fluid and the second liquid heat exchange medium.

The method may further comprise
transporting coolant fluid to a second heat-exchanging arrangement arranged in the second liquid container.

The invention also relates to a vehicle comprising an air conditioning system according to the above description.

DETAILED DESCRIPTION

Figure 1:
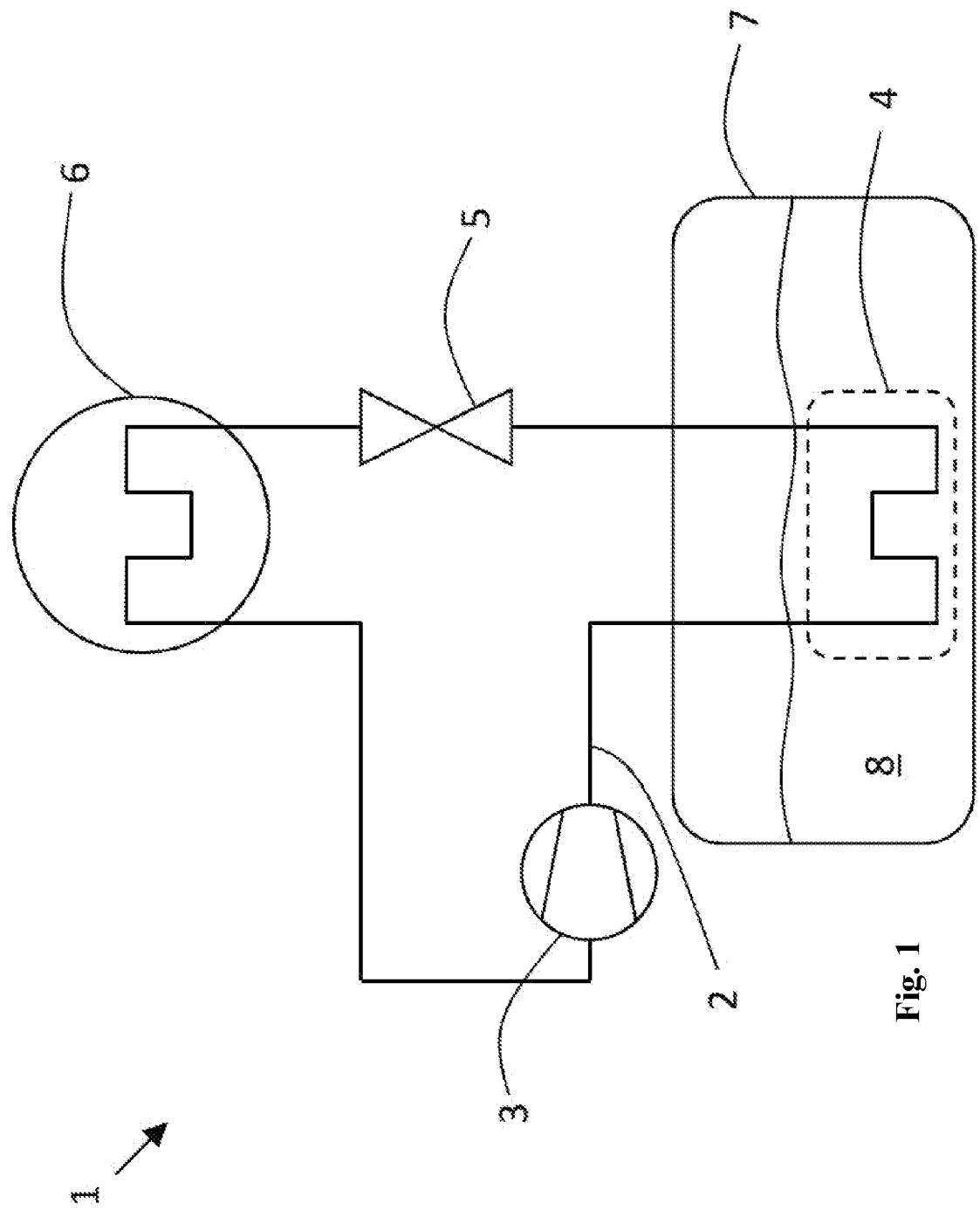
FIG. 1 schematically shows an air conditioning system for a vehicle according to a first example embodiment, FIG. 2 schematically shows an air conditioning system for a vehicle according to a second example embodiment, FIG. 3 schematically shows an air conditioning system for a vehicle according to a third example embodiment, FIG. 4 schematically shows an air conditioning system for a vehicle according to a fourth example embodiment, FIG. 5 schematically shows an air conditioning system for a vehicle according to a fifth example embodiment, FIG. 6 schematically shows an air conditioning system for a vehicle according to a sixth example embodiment, FIG. 7 schematically shows a vehicle comprising an air conditioning system for a vehicle according to the disclosure, FIG. 8 schematically show a chart showing cooling power over travel time for a sunny day.

FIG. 1 schematically shows an air conditioning system 1 for a vehicle according to a first example embodiment.

The basic components of an air conditioning system 1 for a vehicle are well known. Such a system comprises a cooling line 2 adapted to transport a coolant fluid through the air conditioning system 1. The cooling line 2 is connected to a compressor 3, a first heat-exchanging arrangement 4, an expansion valve 5 and a cabin heat-exchanging arrangement 6. The first heat-exchanging arrangement 4 is in the first example embodiment a condenser or evaporator depending on the desired functionality of the air conditioning system 1. The cabin heat-exchanging arrangement 6 is, in the first example embodiment, an evaporator and is arranged in connection to a blower (not shown) that is arranged to blow air through the cabin heat-exchanging arrangement 6 to provide cool air into the cabin of the vehicle.

According to a prior art system, the first heat-exchanging arrangement 4, is normally arranged in the vehicle such that ambient air can is led past the first heat-exchanging arrangement 4 in order to exchange heat between the air being led past the first heat-exchanging arrangement 4 and the coolant fluid passing through the first heat-exchanging arrangement 4.

According to the first example embodiment, the first heat-exchanging arrangement 4 is arranged inside a first liquid container 7 that is arranged to hold a first liquid heat exchange medium 8. The first heat-exchanging arrangement 4 is arranged inside the first liquid container 7 for exchanging heat between the coolant fluid and the first liquid heat exchange medium 8.

The first liquid heat exchange medium 8 is for instance liquid fuel such as petrol, diesel, liquefied natural gas or liquefied hydrogen. In this case the first liquid container 7 is a fuel tank. The first liquid heat exchange medium 8 can also be windshield washer fluid. In this case the first liquid container 7 is a windshield washer fluid container. In order for the windshield washer fluid container to function as a liquid container for a liquid heat exchange medium, the windshield washer container may need be made more durable, for instance by increasing the thickness of the material the windshield washer container is made of. The first liquid heat exchange medium 8 can also be engine oil and the first liquid container 7 is an engine oil sump. The first liquid heat exchange medium 8 can also be transmission oil and the first liquid container 7 is a transmission oil reservoir.

The various heat-exchanging arrangements referred to in the description are illustrated as generic heat exchangers in the figures and can take various forms. The dashed line surrounding the heat-exchanging arrangements that are arranged in liquid containers illustrate the possibility that the heat-exchanging arrangements are enclosed or that they are conduits submerged in the liquid heat exchange medium.

Figure 2:
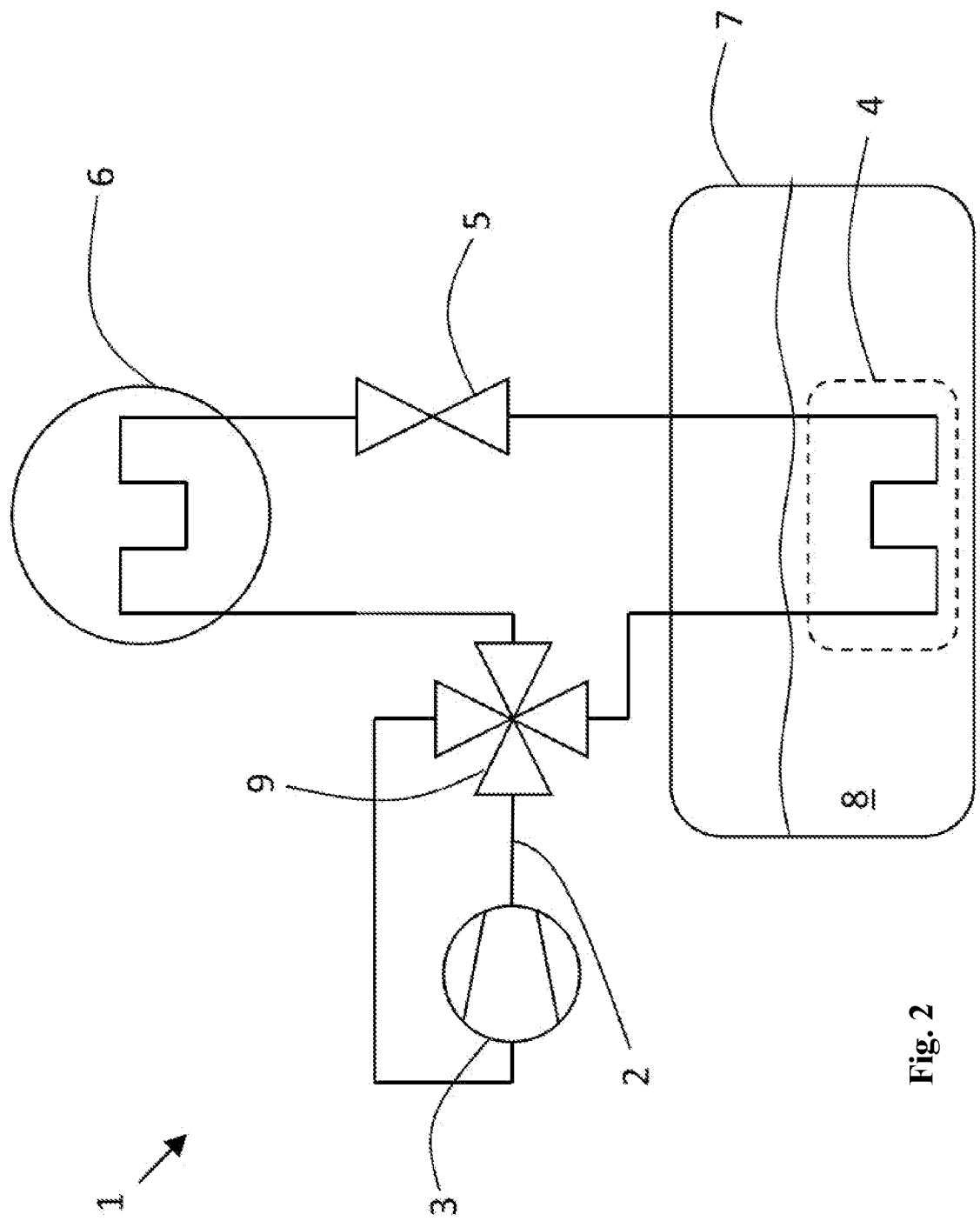

FIG. 2 schematically shows an air conditioning system 1 for a vehicle according to a second example embodiment. In the second example embodiment, the air conditioning system 1 further comprises a reversing valve 9 connected to the first heat-exchanging arrangement 4. The reversing valve 9 is arranged to selectively reverse the flow of the coolant fluid in the air conditioning system 1. The reversing valve 9 is a component normally found in indoor air conditioning systems where it allows the air conditioner to selectively provide cool or hot air to the space in which it is installed. By providing the air conditioning system 1 for a vehicle with such a valve, the same function can be achieved in a vehicle. The design and function of the reversing valve 9 is well known and will not be described in further detail. The reversing valve 9 can be automatically controlled by an electronic control unit of the vehicle and based on the desired output temperature inside the cabin and the outside temperature or be manually controlled through controls inside the cabin.

Figure 3:
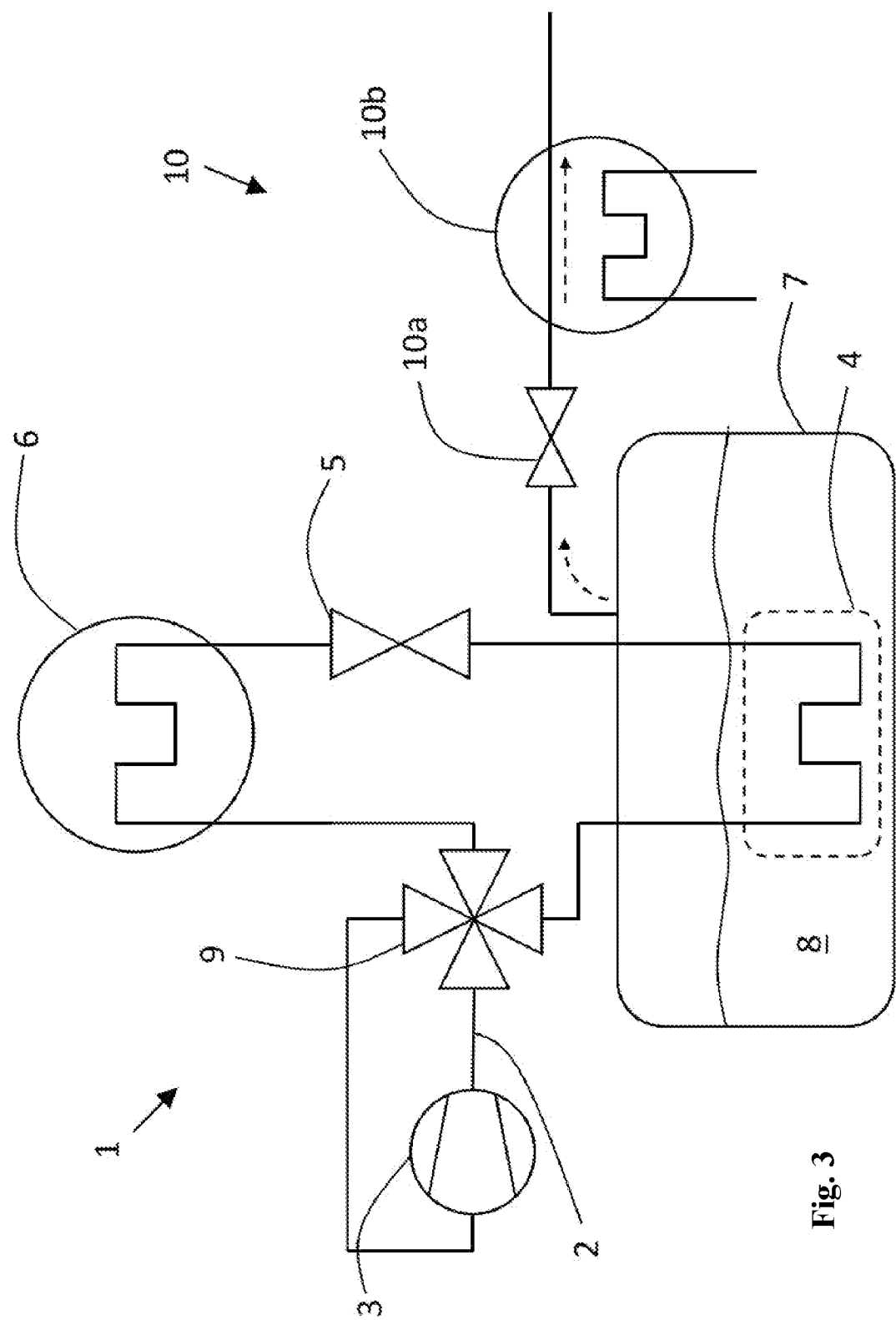

FIG. 3 schematically shows an air conditioning system 1 for a vehicle according to a third example embodiment. In FIG. 3, the air conditioning system 1 according to FIG. 2 is equipped with a cooling system 10 separate from the air conditioning system 1. The separate cooling system 10 is arranged to condense any vapour evaporated from the first liquid heat exchange medium 8 and to return it to the first liquid container 7. In case the first liquid heat exchange medium 8 is a liquid fuel, the condensed fuel can also be transported directly to the engine. The separate cooling system 10 comprises a control valve 10a and a cooler 10b. The cooler 10b is illustrated as a generic heat exchanger and can take various forms. The arrows illustrate vapour leaving the first liquid container to be cooled by the separate cooling system 10. A return connection or a connection to a user of the liquid condensed by the separate cooling system 10 are not shown.

The air conditioning system 1 according to FIG. 1 can also be provided with a cooling system 10 separate from the air conditioning system 1.

Figure 4:
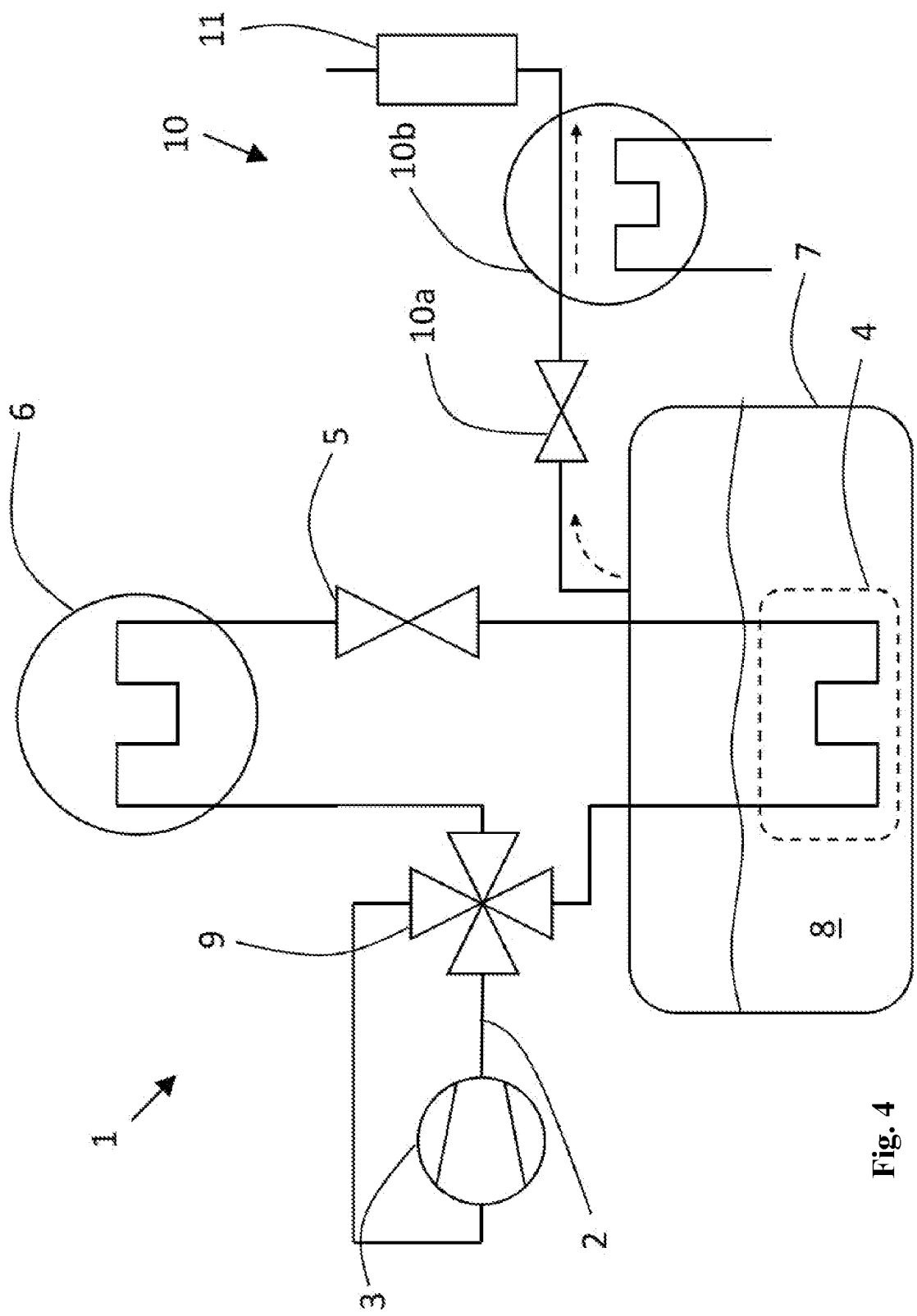

FIG. 4 schematically shows an air conditioning system 1 for a vehicle according to a fourth example embodiment. In FIG. 4, the air conditioning system 1 further comprises an evaporative emission canister 11 arranged to be connected to the first liquid container 7. The evaporative emission container can be arranged to be connected to the cooling system 10 separate from the air conditioning system 1 as illustrated in FIG. 4, or be arranged to be connected directly to the first liquid container 7.

Figure 5:
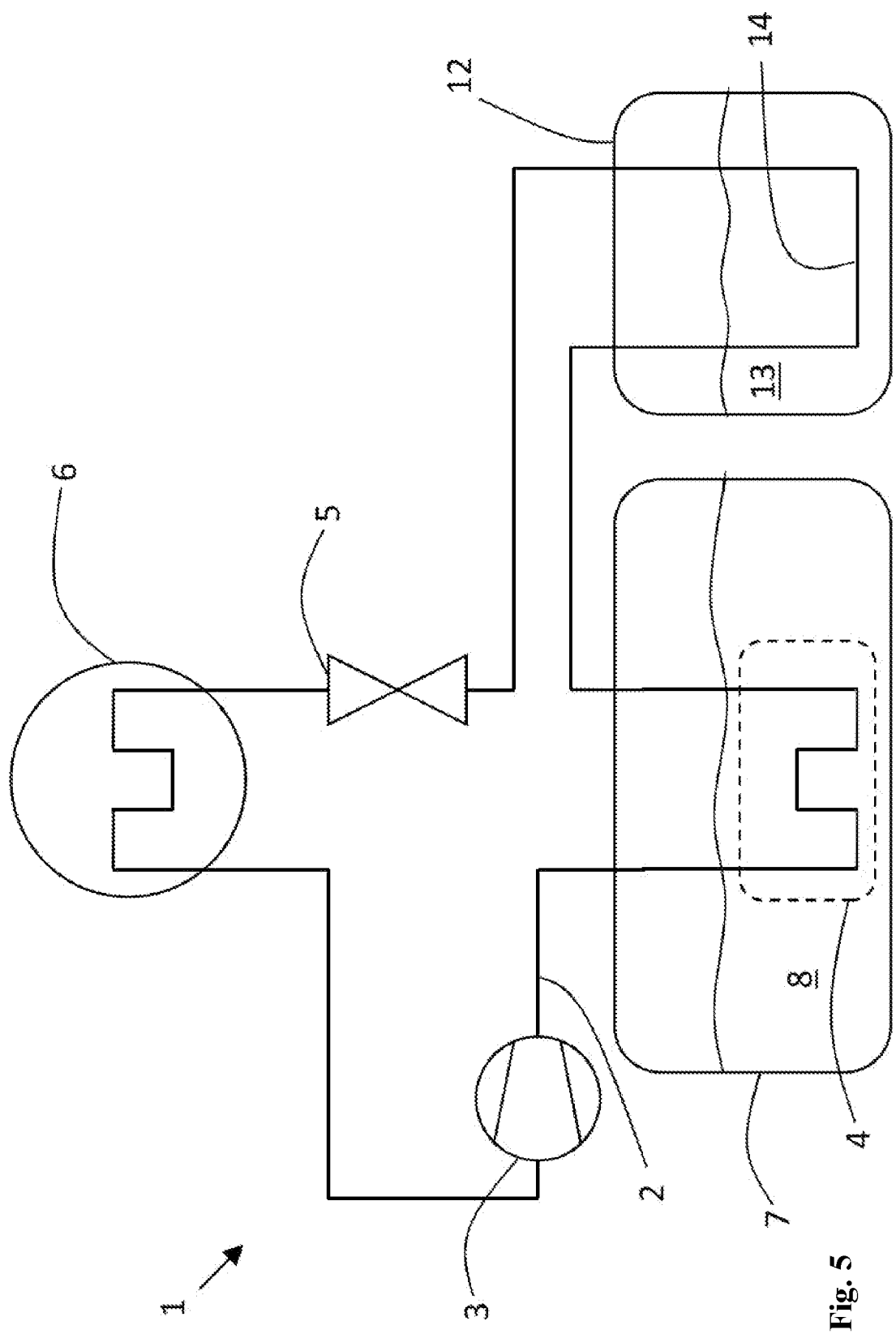

FIG. 5 schematically shows an air conditioning system 1 for a vehicle according to a fifth example embodiment. In FIG. 5, the air conditioning system 1 comprises a second liquid container 12 arranged to hold a second liquid heat exchange medium 13 and a coolant fluid connection 14 arranged in the second liquid container 12 for exchanging heat between the coolant fluid and the second liquid heat exchange medium 13. In FIG. 5, the coolant fluid connection 14 is a straight conduit placed inside the second liquid container 12. Heat is exchanged between the coolant fluid passing through the coolant fluid connection 14 and the second liquid heat exchange medium 13. The first heat-exchanging arrangement 4 is in FIG. 5 arranged in series with the coolant fluid connection 14. This setup works well when the second liquid heat exchange medium is a windshield washer fluid.

Figure 6:
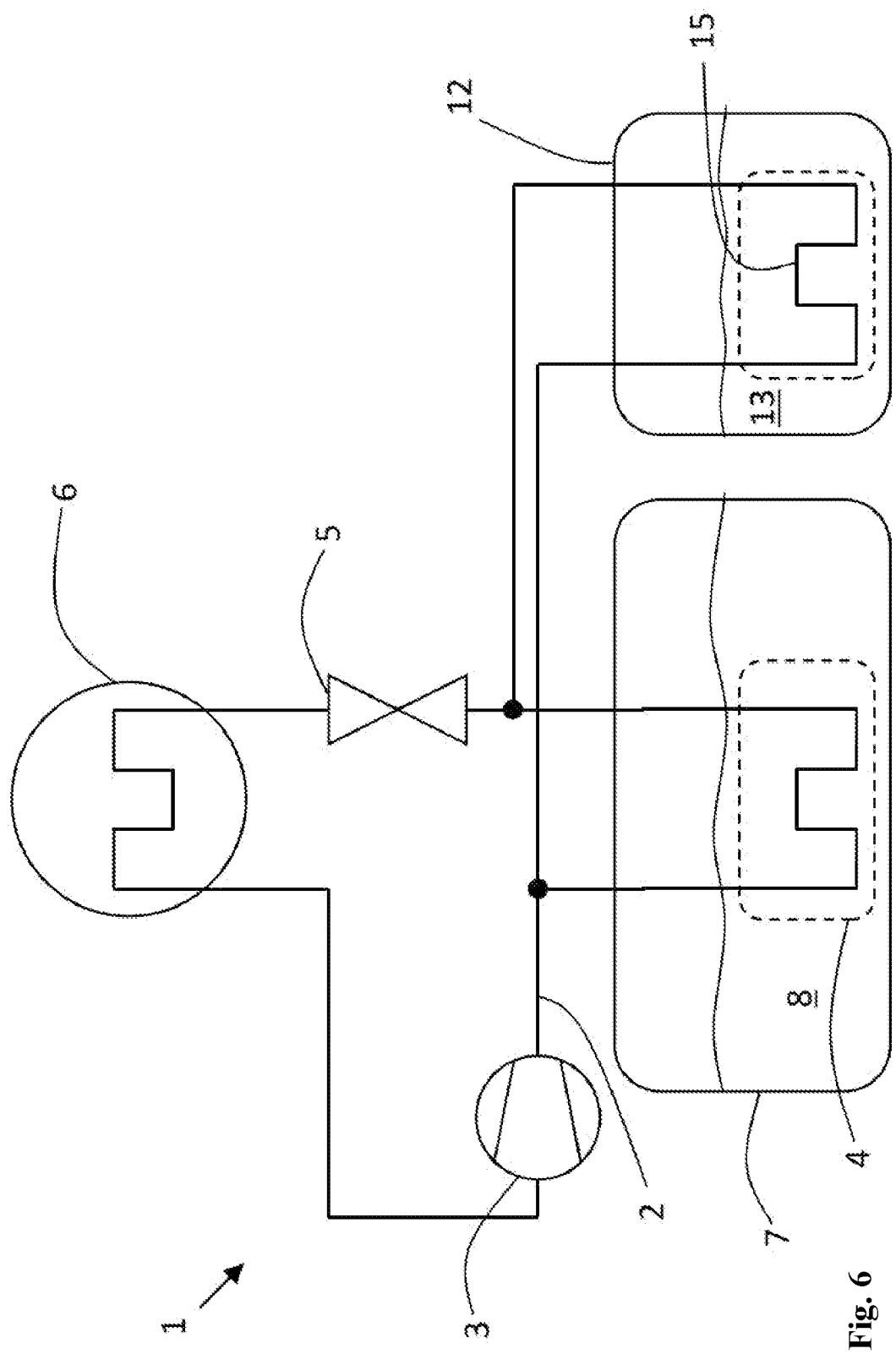

FIG. 6 schematically shows an air conditioning system 1 for a vehicle according to a sixth example embodiment. In FIG. 6, the coolant fluid connection 14 is a second heat-exchanging arrangement 15 such as a condenser/evaporator (depending on the desired functionality of the air conditioning system) to increase the efficiency of the heat exchange between the coolant fluid inside the second heat-exchanging arrangement 15 and the second liquid heat exchange medium 13. In FIG. 6, the first heat-exchanging arrangement 4 is arranged in parallel with the coolant fluid connection 14, i.e. the second heat-exchanging arrangement 15.

It is of course also possible to have a second heat-exchanging arrangement 15 arranged in series with the first heat-exchanging arrangement 4 as described in FIG. 5.

Figure 7:
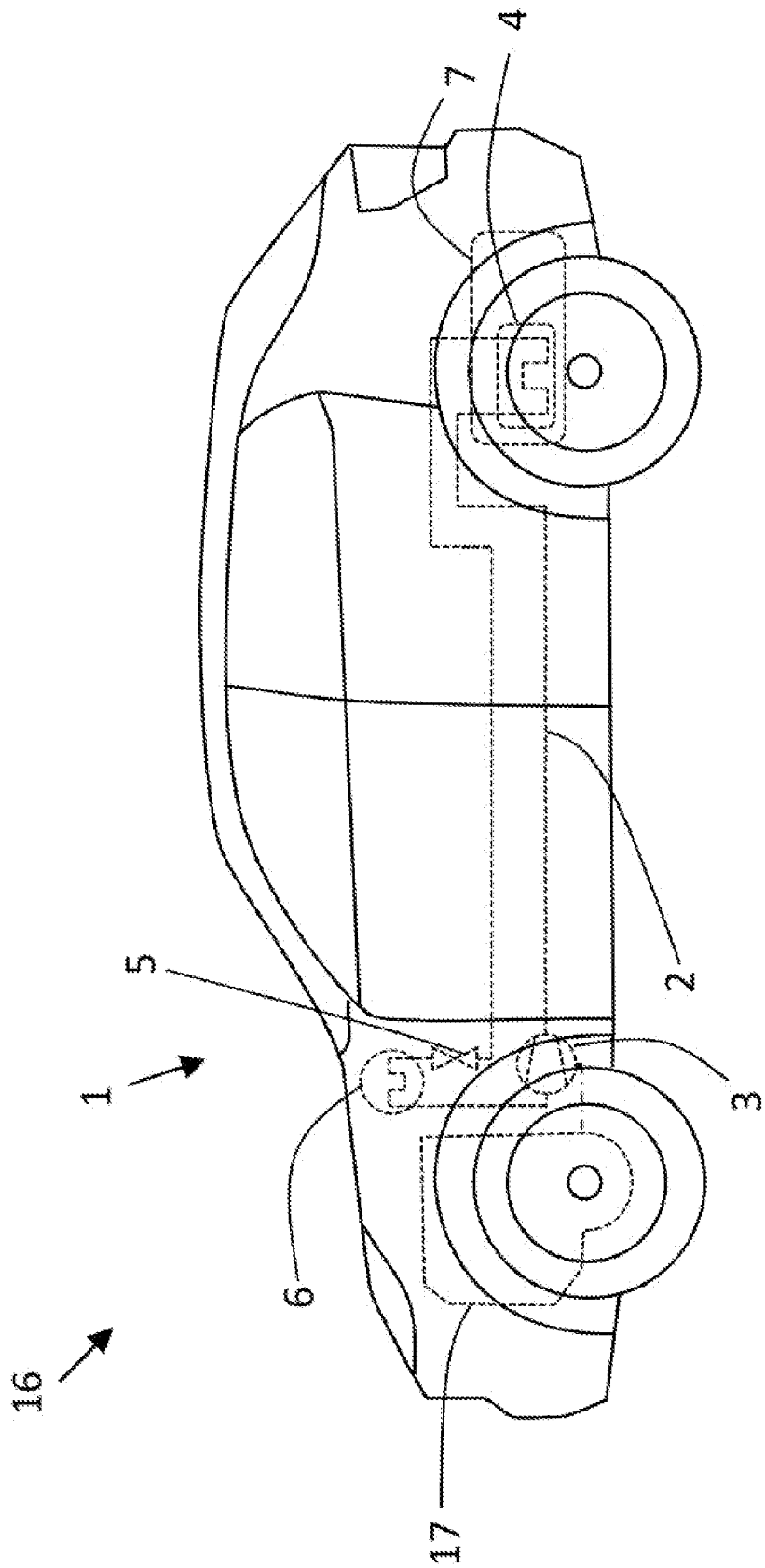

FIG. 7 schematically shows a vehicle 16 comprising an air conditioning system 1 for a vehicle 16 according to FIG. 1. The compressor 3 is in FIG. 7 arranged to be driven by the combustion engine 17. In the figure, the first liquid container 7 is a fuel tank and the first heat exchange medium 4 is arranged therein. The cabin heat-exchanging arrangement 6 is arranged close to the cabin and is arranged to cool outside air blown past the cabin heat-exchanging arrangement 6 by a blower (not shown) into the cabin. The expansion valve 5 is arranged in connection to the cabin heat-exchanging arrangement 6. The placement of the various components of the air conditioning system 1 is for illustrative purposes only and the final placement may vary depending on the final design of the vehicle 16.

Vehicles with an air conditioning system 1 according to the example embodiments described in conjunction with FIGS. 2-6 are not explicitly shown. It is considered that the person skilled in the art understands how to adapt the various example embodiments of the air conditioning system in the disclosure to fit in a vehicle 16.

It is also possible for the air conditioning system 1 to be implemented in an electric vehicle, utilizing one or more of the liquids available in such a vehicle.

Figure 8:
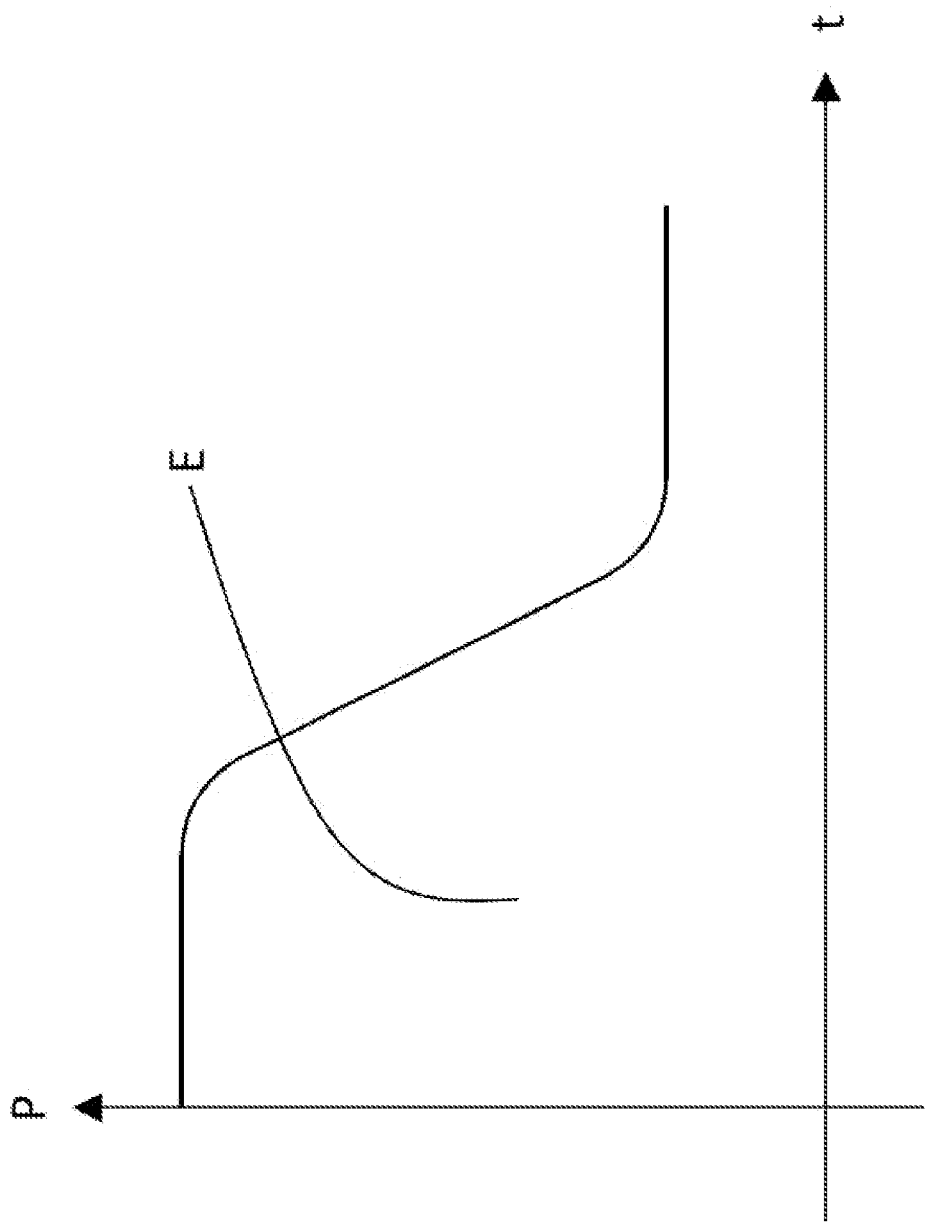

FIG. 8 schematically show a chart showing cooling power over travel time for a sunny day. The chart axes are travel time t, on the horizontal axis and cooling power P, on the vertical axis. At a start time t1, the air conditioning system operates at maximum cooling power to decrease the temperature in the vehicle. As the temperature inside the cabin drops, cooling power is reduced at time t2. Towards the end, at time t3, a lower amount of cooling power is needed to maintain a desired temperature in the cabin. The area under the graph is the energy E that is accumulated in the liquid heat exchange medium in the liquid container.

In known air conditioning systems, the air conditioning system has to be designed for peak load cooling power as the heat exchange between the ambient air and the coolant fluid in the air conditioning system is limited. In the air conditioning system according to the disclosure, the coolant fluid can exchange heat with the liquid heat exchange medium in the liquid container more efficiently and thereby be designed to provide an average load cooling power. The energy E heats the liquid heat exchange medium, which slowly cools down over time to a temperature that is safe for a parked vehicle. The cooling can be made with or without assistance from a separate cooling system.

Although the disclosure has been illustrated and described in detail in the drawings and foregoing description, such illustration and description are to be considered illustrative or exemplary and the disclosure is not limited to the disclosed example embodiments.

For instance, all example embodiments may comprise a cooling system 10 separate from the air conditioning system 1. Further, all example embodiments may comprise an evaporative emission canister 11, with or without a cooling system 10 separate from the air conditioning system 1. All example embodiments with a second liquid container 12 and a second heat-exchanging arrangement 15 may comprise at least one reversing valve 9 such that the flow of coolant fluid in the air conditioning system 1 can selectively be reversed. Controlling the air conditioning system according to the disclosure is made in the same way as today, with the necessary changes being made in the electronic control unit/units that control the vehicle's air conditioning system to adapt for the different placement of the first heat-exchanging arrangement.

What is claimed is:

1. An air conditioning system for a vehicle, wherein the air conditioning system comprises a cooling line adapted to transport a coolant fluid and a first heat-exchanging arrangement connected to the cooling line,
   wherein the air conditioning system comprises a first liquid container being arranged to hold a first liquid heat exchange medium and wherein the first heat-exchanging arrangement is arranged inside the first liquid container for exchanging heat between the coolant fluid and the first liquid heat exchange medium,
   wherein the air conditioning system further comprises a vapour cooling system arranged to condense any vapour evaporated from the first liquid heat exchange medium,
   wherein the air conditioning system comprises a second liquid container arranged to hold a second liquid heat exchange medium and a coolant fluid connection arranged in the second liquid container for exchanging heat between the coolant fluid and the second liquid heat exchange medium, and
   wherein the first liquid heat exchange medium is a different medium substance than the second liquid heat exchange medium.

2. The air conditioning system according to claim 1, wherein the air conditioning system further comprises a reversing valve connected the first heat-exchanging arrangement, the reversing valve being arranged to selectively reverse the flow of the coolant fluid in the air conditioning system.

3. The air conditioning system according to claim 1, wherein the first liquid heat exchange medium is one of:
   liquid fuel,
   windshield washer fluid,
   engine oil, or
   transmission oil.

4. The air conditioning system according to claim 1, wherein the first liquid heat exchange medium is liquid fuel, wherein the air conditioning system further comprises an evaporative emission canister arranged to be connected to the liquid container, the evaporative emission canister being arranged to capture hydrocarbons evaporated from the first liquid heat exchange medium.

5. The air conditioning system according to claim 1, wherein the coolant fluid connection is a second heat-exchanging arrangement arranged in the second liquid container.

6. The air conditioning system according to claim 1, wherein the first heat-exchanging arrangement and the second heat-exchanging arrangement are arranged in series or are arranged in parallel.

7. The air conditioner system according to claim 1, wherein the first liquid heat exchange medium is one of liquid fuel, engine oil, or transmission oil, and the second liquid heat exchange medium is windshield washer fluid.

8. A method for heat exchange of a coolant fluid of an air conditioning system of a vehicle, wherein the air conditioning system comprises a cooling line adapted to transport a coolant fluid and a first heat-exchanging arrangement connected to the cooling line, wherein a first liquid container is arranged to hold a first liquid heat exchange medium and a first heat-exchanging arrangement is arranged within the liquid container, wherein the air conditioning system further comprises a second liquid container arranged to hold a second liquid heat exchange medium and a coolant fluid connection arranged in the second liquid container, wherein the first liquid heat exchange medium is a different medium substance than the second liquid heat exchange medium, and wherein the method comprises:

starting the air conditioning system, transporting coolant fluid to the first heat-exchanging arrangement, exchanging heat between the coolant fluid and the first liquid heat exchange medium to decrease the temperature of the coolant fluid, transporting coolant fluid to the coolant fluid connection, exchanging heat between the coolant fluid and the second liquid heat exchange medium, condensing any vapour evaporated from the first liquid heat exchange medium in the liquid container by the heat exchange with the coolant fluid in the first heat-exchanging arrangement with a vapour cooling system that is separate from the air conditioning system.

9. The method according to claim 8, wherein the air conditioning system further comprises a reversing valve connected to the first heat-exchanging arrangement, being arranged to selectively reverse the flow of the coolant fluid in the air conditioning system, wherein the method comprises:

transporting coolant fluid to the first heat-exchanging arrangement, exchanging heat between the coolant fluid and the first liquid heat exchange medium to increase the temperature of the coolant fluid.

10. The method according to claim 8, wherein the method comprises:

capturing hydrocarbons evaporated from the first liquid heat exchange medium of the first liquid container by an evaporative emission canister arranged to be connected to the first liquid container when the first liquid heat exchange medium is liquid fuel.

11. A vehicle comprising an air conditioning system according to claim 1.

12. The method according to claim 8, wherein the first liquid heat exchange medium is one of liquid fuel, engine oil, or transmission oil, and the second liquid heat exchange medium is windshield washer fluid.

\* \* \* \* \*